United States Patent
Morinaga et al.

(10) Patent No.: US 8,214,110 B2
(45) Date of Patent: Jul. 3, 2012

(54) CONSTRUCTION MACHINE AND METHOD OF CONTROLLING CONSTRUCTION MACHINE

(75) Inventors: Jun Morinaga, Hiratsuka (JP); Hiroaki Inoue, Hiratsuka (JP); Tadashi Kawaguchi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 484 days.

(21) Appl. No.: 12/450,062

(22) PCT Filed: Mar. 27, 2008

(86) PCT No.: PCT/JP2008/055921
§ 371 (c)(1),
(2), (4) Date: Sep. 10, 2009

(87) PCT Pub. No.: WO2008/120682
PCT Pub. Date: Oct. 9, 2008

(65) Prior Publication Data
US 2010/0031650 A1    Feb. 11, 2010

(30) Foreign Application Priority Data
Mar. 29, 2007  (JP) ................................ 2007-089592

(51) Int. Cl.
*G06F 7/70* (2006.01)
(52) U.S. Cl. ............... 701/50; 701/49; 172/4.5; 60/459; 180/65.28
(58) Field of Classification Search .................... 701/49, 701/50; 180/65.28; 60/459; 172/4.5, 9
See application file for complete search history.

(56) References Cited

U.S. PATENT DOCUMENTS

| 6,666,022 B1 * | 12/2003 | Yoshimatsu et al. ............ 60/413 |
| 2005/0246082 A1 * | 11/2005 | Miki et al. ..................... 701/50 |
| 2007/0187180 A1 | 8/2007 | Kagoshima et al. |

FOREIGN PATENT DOCUMENTS

| EP | 1 720 244 | 11/2006 |
| JP | 2005-233164 | 9/2005 |
| JP | 2005-237178 | 9/2005 |
| JP | 2005-344524 | 12/2005 |
| JP | 2007-71197 | 3/2007 |
| WO | WO-2005/081393 | 1/2005 |

OTHER PUBLICATIONS

International Search Report and Written Opinion issued in PCT/JP2008/055921 dated Jun. 17, 2008.

* cited by examiner

*Primary Examiner* — Gertrude Arthur Jeanglaude
(74) *Attorney, Agent, or Firm* — Edwards Wildman Palmer LLP (57) ABSTRACT

The present invention provides a construction machine where overheating of mounted electric devices can be prevented properly with a simple structure and a method of controlling the construction machine. For this purpose, a pump target discharge flow rate of a hydraulic pump is calculated based on an operated amount of an operating unit, a temperature of an electric device mounted on the construction machine is detected, an engine minimum speed, which is a minimum possible speed of an engine in carrying out low-speed matching for matching output of the engine and pump absorbing horsepower of the hydraulic pump to each other in a low-speed region where speed of the engine is lower than set speed, is calculated by using the detected temperature of the electric device, and a maximum value out of a corresponding speed of the pump target discharge flow rate and the engine minimum speed is generated as a candidate for an engine target speed.

5 Claims, 5 Drawing Sheets

CONSTRUCTION MACHINE AND METHOD OF CONTROLLING CONSTRUCTION MACHINE

TECHNICAL FIELD

The present invention relates to a construction machine including an engine and a generator motor coupled to each other as drive sources and a hydraulic pump driven by the engine and the generator motor and a method of controlling the construction machine.

BACKGROUND TECHNIQUE

Conventionally, a hybrid vehicle using an engine and a generator motor coupled to each other as drive sources includes electric devices such as a storage device for giving and receiving electric power to and from the generator motor, a booster for boosting voltage of the storage device, and an inverter for driving the generator motor. If these electric devices accumulate excessive heat, they may become damaged to make a system of the hybrid vehicle inoperative. To solve this problem, a technique for preventing overheating of the electric devices by properly cooling the electric devices provided to the hybrid vehicle is disclosed (see Patent Document 1, for example).

Patent Document 1: Japanese Patent Application Laid-Open No. 2005-344524

DISCLOSURE OF INVENTION

Problems to be Solved by the Invention

To reliably prevent the system of the hybrid vehicle from becoming inoperative, it is preferable to increase capacitance of the storage device in addition to cooling of the electric devices. However, if the capacitance of the storage device is increased in the above-described prior art, a cooling system necessarily becomes larger and more complicated due to the increase in the capacitance, which may cause problems in weight, installation space and cost of the storage device and the cooling system.

In a case of a hybrid construction machine further including a hydraulic pump driven by the engine and the generator motor, the electric devices may become overheated when input of an operation command is repeated to carry out low-speed matching for matching output of the engine and pump absorbing horsepower of the hydraulic pump to each other in a low-speed region where engine speed is lower than set engine speed. This point will be described in greater detail below.

In carrying out the low-speed matching, the engine speed is low before the operation command is input. Therefore, when the operation command is input, it is necessary to quickly increase the engine speed from low speed to high speed. To quickly increase the engine speed from the low speed to the high speed, it is necessary to assist engine rotation by driving the generator motor as a motor. If the generator motor is driven as the motor, loads are applied to the electric devices to generate heat. Therefore, if the generator motor is driven repeatedly, the electric devices may become overheated over rated temperatures.

The present invention has been made with the above circumstances in view and it is an object of the invention to provide a construction machine where overheating of mounted electric devices can be prevented properly with a simple structure and a method of controlling the construction machine.

Means for Solving Problems

According to an aspect of the present invention, a construction machine includes: an engine and a generator motor coupled to each other; a storage device for storing electric power generated by the generator motor and supplying electric power to the generator motor; a hydraulic pump driven by the engine and the generator motor; a hydraulic actuator to which pressure oil discharged from the hydraulic pump is supplied; an operating unit for operating the hydraulic actuator; a pump target discharge flow rate calculating unit for calculating a pump target discharge flow rate of the hydraulic pump based on an operated amount of the operating unit; a temperature detecting unit for detecting temperature of an electric device mounted on the construction machine; a storage unit for storing an engine minimum speed, which is a minimum possible speed of the engine in carrying out low-speed matching for matching output of the engine and pump absorbing horsepower of the hydraulic pump to each other in a low-speed region where a speed of the engine is lower than a set speed, as a function of the temperature of the electric device where the engine minimum speed increases or is a constant value as the temperature increases; an engine minimum speed calculating unit for calculating the engine minimum speed corresponding to the temperature of the electric device detected by the temperature detecting unit based on the temperature of the electric device and the function stored in the storage unit; and an engine target speed candidate generating unit for generating a maximum value out of a corresponding speed of the pump target discharge flow rate calculated by the pump target discharge flow rate calculating unit and the engine minimum speed calculated by the engine minimum speed calculating unit as a candidate for an engine target speed.

Advantageously, in the construction machine, the electric device is the storage device.

Advantageously, the construction machine further includes a booster for boosting voltage of the storage device to output. The electric device is the booster.

Advantageously, the construction machine further comprising a booster for boosting voltage of the storage device to output. The electric devices are the storage device and the booster, and the engine minimum speed calculating unit calculates a first engine minimum speed and a second engine minimum speed respectively corresponding to a temperature of the storage device and a temperature of the booster detected by the temperature detecting unit.

According to another aspect of the present invention, a method of controlling a construction machine, which includes an engine and a generator motor coupled to each other, a storage device for storing electric power generated by the generator motor and supplying electric power to the generator motor, a hydraulic pump driven by the engine and the generator motor, a hydraulic actuator to which pressure oil discharged from the hydraulic pump is supplied, and an operating unit for operating the hydraulic actuator, includes: a pump target discharge flow rate calculating step for calculating a pump target discharge flow rate of the hydraulic pump based on an operated amount of the operating unit; a temperature detecting step for detecting temperature of an electric device mounted on the construction machine; an engine minimum speed calculating step for calculating an engine minimum speed, which is a minimum possible speed of the engine in carrying out low-speed matching for matching output of the engine and pump absorbing horsepower of the hydraulic pump to each other in a low-speed region where a speed of the engine is lower than a set speed, by using the temperature of the electric device detected in the temperature detecting step; and an engine target speed candidate generating step for generating a maximum value out of a corresponding speed of the pump target discharge flow rate calculated in the pump target discharge flow rate calculating step and the engine minimum speed calculated in the engine minimum speed calculating step as a candidate for an engine target speed. The engine minimum speed is a function of the temperature of the electric device where the engine minimum speed increases or is a constant value as the temperature increases.

EFFECTS OF THE INVENTION

According to the invention, the engine minimum speed in carrying out the low-speed matching increases or is the constant value as the temperatures of the electric devices increase and therefore a range of variation in the engine speed is narrowed and loads on the electric devices are reduced. As a result, increase in the temperatures of the electric devices can be suppressed. Consequently, overheating of the mounted electric devices can be prevented properly with a simple structure without relying on increase in capacitance of the storage device.

BRIEF DESCRIPTION OF DRAWINGS

FIG. 5 is a drawing showing a functional relationship which an engine target speed second candidate calculating unit refers to.

FIG. 6 is a drawing showing a functional relationship which an engine target speed third candidate calculating unit refers to.

EXPLANATIONS OF LETTERS OR NUMERALS 1 hydraulic shovel
2 engine
3 hydraulic pump
5 pump control valve
6 controller
7, 8, 9 hydraulic pressure sensor
10 PTO shaft
11 generator motor
12 storage device
13, 17 temperature sensor
16 booster
50 hydraulic actuator target flow rate calculating unit
51 boom target flow rate calculating unit
52 arm target flow rate calculating unit
53 bucket target flow rate calculating unit
54 swing motor speed command unit
55 right running target flow rate calculating unit
56 left running target flow rate calculating unit
58 swing flow rate calculating unit
60 pump target discharge flow rate calculating unit
61 engine target speed first candidate calculating unit
62 engine target speed second candidate calculating unit
63 engine target speed third candidate calculating unit
66 second engine target speed setting unit
68 pump output limit calculating unit
69 third engine speed calculating unit
70 minimum value selecting unit
80 storage device
102 swing controller
103 swing motor
105 swing speed sensor
201 running body
202 swing body
203 boom
204 arm
205 bucket

BEST MODE FOR CARRYING OUT THE INVENTION

Figure 1:
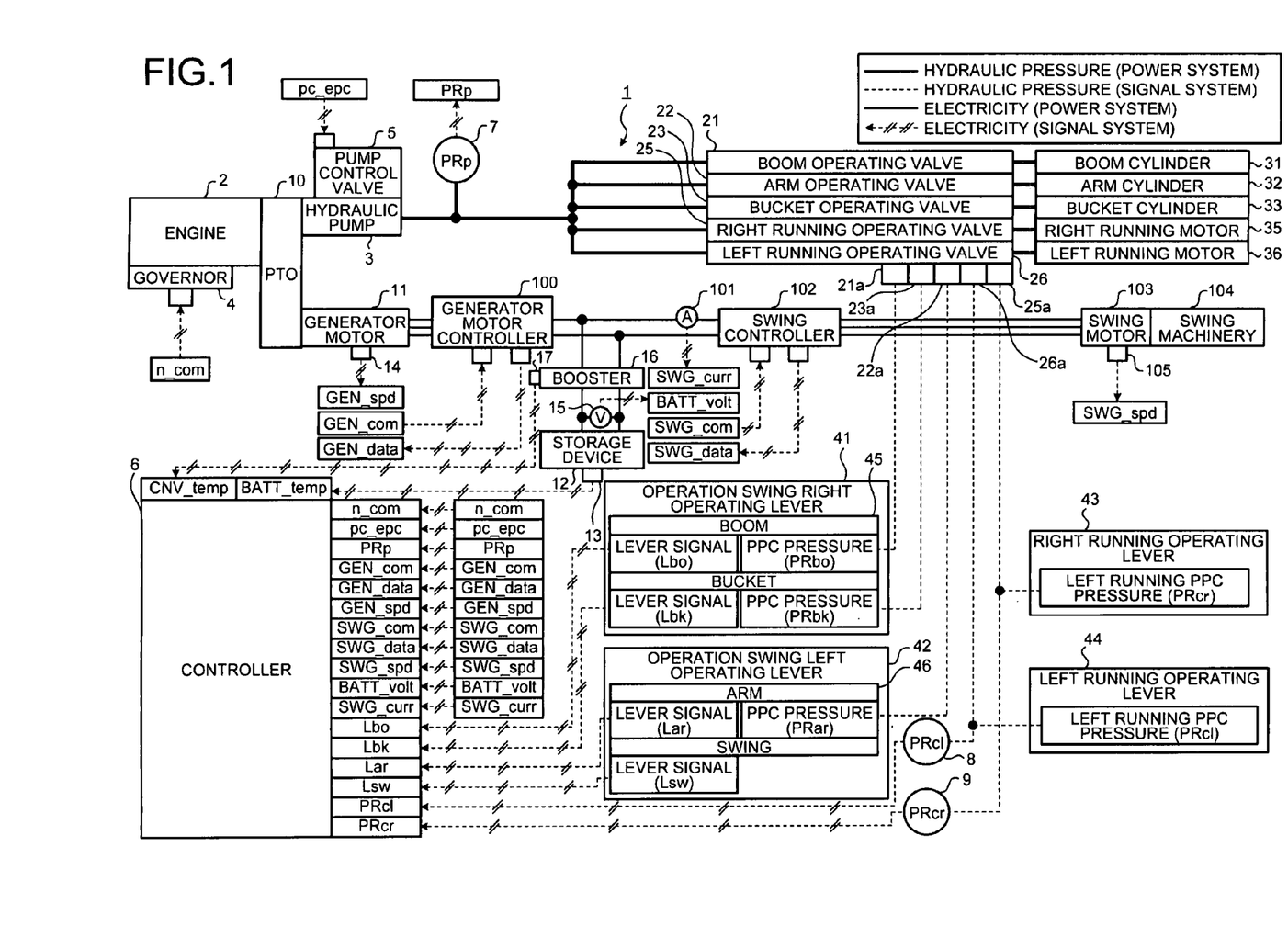
FIG. 1 is a drawing showing a structure of an essential portion of a construction machine according to an embodiment of the present invention.

A best mode (hereafter referred to as "embodiment") for carrying out the present invention will be described below with reference to the accompanying drawings. FIG. 1 is a drawing showing a general structure of a construction machine according to the embodiment of the invention. In the present embodiment, a construction machine is a hydraulic shovel having an excavating function.

Figure 2:
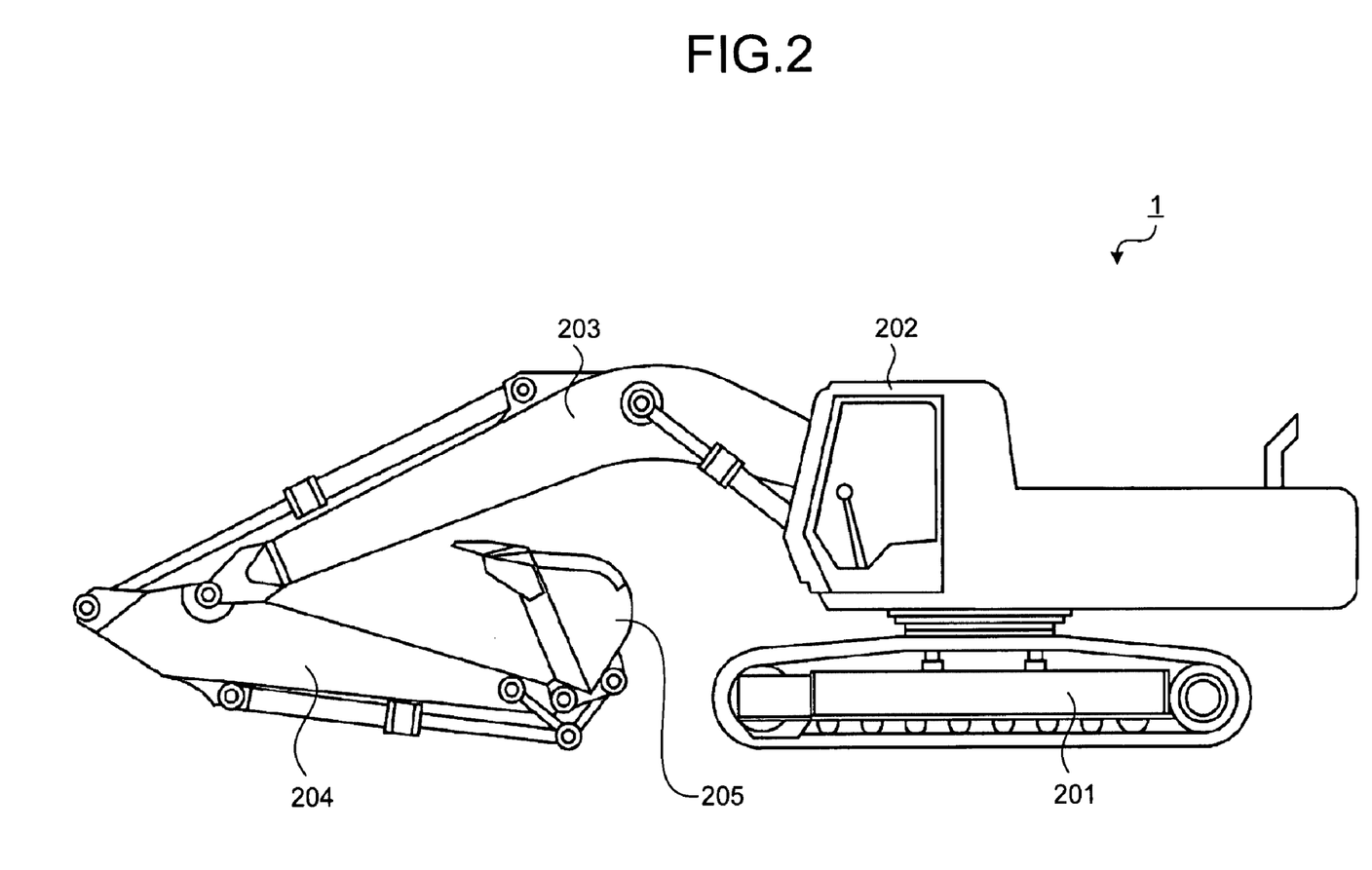
FIG. 2 is a drawing showing an external structure of the construction machine (hydraulic shovel) according to the embodiment of the invention.

FIG. 2 is a drawing showing an external structure of the hydraulic shovel. The hydraulic shovel 1 shown in the drawing includes a running body 201 and a swing body 202. The running body 201 is made up of left and right crawler tracks. On the swing body 202, an operating machine made up of a boom 203, an arm 204, and a bucket 205 is mounted.

In the hydraulic shovel 1, a boom cylinder 31 is driven to actuate the boom 203, an arm cylinder 32 is driven to actuate the arm 204, and a bucket cylinder 33 is driven to actuate the bucket 205. A right running motor 35 and a left running motor 36 are driven respectively to rotate the right crawler track and the left crawler track. The boom cylinder 31, the arm cylinder 32, and the bucket cylinder 33 are hydraulic cylinders and the right running motor 35 and the left running motor 36 are hydraulic motors.

The engine 2 is a diesel engine and its output (horsepower) is controlled by adjusting an amount of fuel injected into cylinders. This adjustment is carried out by controlling a governor 4 attached to a fuel injection pump of the engine 2.

A controller 6 outputs a speed command value for causing an engine speed to be a target speed n_com to the governor 4. The governor 4 adjusts the fuel injection amount to achieve the target speed n_com.

An output shaft of the engine 2 is coupled to a drive shaft of the generator motor 11 with a PTO shaft 10 interposed therebetween. The generator motor 11 performs functions of a generator and a motor. In other words, the generator motor 11 operates as a generator as well as a motor.

The generator motor 11 functions as a starter for starting the engine 2. If a starter switch is turned on, the generator motor 11 functions as a motor to rotate the output shaft of the engine 2 at low speed (e.g., 400 to 500 rpm) to start the engine 2.

Torque of the generator motor 11 is controlled by a generator motor controller 100. The generator motor controller 100 controls the torque of the generator motor 11 according to a generator motor command value GEN_com output from the controller 6.

The generator motor controller 100 is electrically connected to the storage device 12 with a DC power supply line interposed therebetween. The controller 6 is powered by the storage device 12.

The storage device 12 is made up of a storage device, a storage battery, or the like and accumulates electric power (charged) generated while the generator motor 11 is functioning as a generator. The storage device 12 supplies the electric power accumulated in the storage device 12 to the generator motor controller 100. The storage device 12 is achieved by any one of the storage device, a lead battery, a nickel hydride battery, and a lithium-ion battery. Internal temperature BATT_temp of the storage device 12 is measured by a temperature sensor 13 (temperature detecting means) and input to the controller 6.

Between the storage device 12 and the generator motor controller 100 and a swing controller 102, a booster 16 for boosting the voltage of the storage device 12 to output is provided. Internal temperature CNV_temp of the booster 16 is measured by a temperature sensor 17 (temperature detecting means) and input to the controller 6.

A drive shaft of a hydraulic pump 3 is coupled to the output shaft of the engine 2 with the PTO shaft 10 interposed therebetween and the output shaft of the engine 2 rotates to thereby drive the hydraulic pump 3. The hydraulic pump 3 is a variable displacement hydraulic pump and its capacity q (cc/rev) changes due to a change in an inclination angle of a swash plate.

Pressure oil discharged from the hydraulic pump 3 at discharge pressure PRp and flow rate Q (cc/min) is supplied to a boom operating valve 21, an arm operating valve 22, a bucket operating valve 23, a right running operating valve 25, and a left running operating valve 26. The pump discharge pressure PRp is detected by a hydraulic pressure sensor 7 and a hydraulic pressure detection signal is input to the controller 6.

The pressure oil output from the boom operating valve 21, the arm operating valve 22, the bucket operating valve 23, the right running operating valve 25, and the left running operating valve 26 is respectively supplied to the boom cylinder 31, the arm cylinder 32, the bucket cylinder 33, the right running motor 35, and the left running motor 36. As a result, the boom cylinder 31, the arm cylinder 32, the bucket cylinder 33, the right running motor 35, the left running motor 36 are driven respectively to actuate the boom 203, the arm 204, the bucket 205, the right crawler track of the running body 201, and the left crawler track of the running body 201.

On the right side of a cab seat of the hydraulic shovel 1 with respect to a forward direction, an operation swing right operating lever 41 and a running right operating lever 43 are provided. On the left side of a cab of the hydraulic shovel 1 with respect to the forward direction, an operation swing left operating lever 42 and a running left operating lever 44 are provided.

The operation swing right operating lever 41 is an operating lever for actuating the boom 203 and the bucket 205, actuates the boom 203 or the bucket 205 depending on an operated direction, and actuates the boom 203 or the bucket 205 at a speed according to an operated amount.

The operation swing right operating lever 41 is provided with a sensor 45 for detecting the operated direction and the operated amount. The sensor 45 inputs a lever signal representing the operated direction and the operated amount of the operation swing right operating lever 41 to the controller 6. If the operation swing right operating lever 41 is operated in such a direction as to actuate the boom 203, a boom lever signal Lbo representing a boom raising operation amount and a boom lowering operation amount is input to the controller 6 according to a direction and an amount of tilt of the operation swing right operating lever 41 with respect to a neutral position. If the operation swing right operating lever 41 is operated in such a direction as to actuate the bucket, a bucket lever signal Lbk representing a bucket excavating operation amount and a bucket dumping operation amount is input to the controller 6 according to a direction and an amount of tilt of the operation swing right operating lever 41 with respect to the neutral position.

If the operation swing right operating lever 41 is operated in such a direction as to actuate the boom 203, pilot pressure (PPC pressure) PRbo according to the amount of tilt of the operation swing right operating lever 41 is applied to a pilot port 21a corresponding to a lever tilted direction (a boom raising direction, a boom lowering direction) out of the respective pilot ports of the boom operating valve 21.

Similarly, if the operation swing right operating lever 41 is operated in such a direction as to actuate the bucket 205, pilot pressure (PPC pressure) PRbk according to the amount of tilt of the operation swing right operating lever 41 is applied to a pilot port 23a corresponding to a lever tilted direction (a bucket excavating direction, a boom dumping direction) out of the respective pilot ports of the bucket operating valve 23.

The operation swing left operating lever 42 is an operating lever for actuating the arm 204 and the swing body 202, actuates the arm 204 or the swing body 202 depending on an operated direction, and actuates the arm 204 or the swing body 202 at a speed according to an operated amount.

The operation swing left operating lever 42 is provided with a sensor 46 for detecting the operated direction and the operated amount. The sensor 46 inputs a lever signal representing the operated direction and the operated amount of the operation swing left operating lever 42 to the controller 6. If the operation swing left operating lever 42 is operated in such a direction as to actuate the arm 204, an arm lever signal Lar representing an arm excavating operation amount and an arm dumping operation amount is input to the controller 6 according to a direction and an amount of tilt of the operation swing left operating lever 42 with respect to a neutral position. If the operation swing left operating lever 42 is operated in such a direction as to actuate the swing body 202, a swing lever signal Lsw representing a right-handed swing operation amount and a left-handed swing operation amount is input to the controller 6 according to a direction and an amount of tilt of the operation swing left operating lever 42 with respect to the neutral position.

If the operation swing left operating lever 42 is operated in such a direction as to actuate the arm, pilot pressure (PPC pressure) PRar according to the amount of tilt of the operation swing left operating lever 42 is applied to a pilot port 22a corresponding to a lever tilted direction (an arm excavating direction, an arm dumping direction) out of the respective pilot ports of the arm operating valve 22.

The running right operating lever 43 and the running left operating lever 44 are operating levers for actuating the right crawler track and the left crawler track, respectively, actuate the crawler tracks according to operated directions, and actuate the crawler tracks at speeds according to operated amounts.

Running right pilot pressure (PPC pressure) PRcr according to an amount of tilt of the running right operating lever 43 is applied to a pilot port 25a of the right running operating valve 25.

The running right pilot pressure PRcr is detected by a hydraulic pressure sensor 9 and the right running pilot pressure PRcr representing a right running amount is input to the controller 6.

Similarly, running left pilot pressure (PPC pressure) PRcl according to an amount of tilt of the running left operating lever 44 is applied to a pilot port 26a of the left running operating valve 26.

The running left pilot pressure PRcl is detected by a hydraulic pressure sensor 8 and the left running pilot pressure PRcl representing a left running amount is input to the controller 6.

Each of the respective operating valves 21 to 23, 25, 26 is a flow/direction control valve, moves its spool in a direction according to the operated direction of a corresponding one of the respective operating levers 41 to 44, and moves its spool to open an oil passage by as much as an opening area corresponding to the operated amount of the one of the respective operating levers 41 to 44.

In the embodiment, the boom cylinder 31, the arm cylinder 32, the bucket cylinder 33, the right running motor 35, and the left running motor 36 are hydraulic actuators to which pressure oil discharged from the hydraulic pump 3 is supplied. The operation swing right operating lever 41, the operation swing left operating lever 42, the running right operating lever 43, and the running left operating lever 44 form at least part of an operating means.

A pump control valve 5 is put into operation by control current pc_epc output from the controller 6. The pump control valve 5 controls the inclination angle of the swash plate of the hydraulic pump 3 so that a product of the discharge pressure PRp (kg/cm$^2$) of the hydraulic pump 3 and the capacity q (cc/rev) of the hydraulic pump 3 does not exceed pump absorbing torque corresponding to the control current pc_epc. This control is called PC control.

To the generator motor 11, a revolution sensor 14 for detecting a current actual speed GEN_spd of the generator motor 11, i.e., an actual speed of the engine 2 is attached. A signal representing the actual speed GEN_spd detected by the revolution sensor 14 is input to the controller 6.

The storage device 12 is provided with a voltage sensor 15 for detecting voltage BATT_volt of the storage device 12. A signal representing the voltage BATT_volt detected by the voltage sensor 15 is input to the controller 6.

The controller 6 outputs a speed command value to the governor 4 to thereby increase or decrease the fuel injection amount to adjust the speed n and torque T of the engine 2 so that target speed according to a current load on the hydraulic pump 3 can be obtained.

The controller 6 outputs a generator motor command value GEN_com to the generator motor controller 100 to drive the generator motor 11. If the controller 6 outputs the command value GEN_com for actuating the generator motor 11 as the generator to the generator motor controller 100, part of output torque generated by the engine 2 is transmitted to the drive shaft of the generator motor 11 via the engine output shaft and the generator motor 11 absorbs the torque of the engine 2 to generate electricity. AC power generated by the generator motor 11 is converted into DC power by the generator motor controller 100 and the storage device 12 accumulates the power (is charged) via the DC power supply line.

If the controller 6 outputs a command value GEN_com for actuating the generator motor 11 as the motor to the generator motor controller 100, the generator motor controller 100 carries out control so that the generator motor 11 is actuated as the motor. In other words, the storage device 12 outputs electric power (discharges electricity), the DC power accumulated in the storage device 12 is converted into AC power by the generator motor controller 100 and supplied to the generator motor 11 to actuate the drive shaft of the generator motor 11 for rotation. As a result, the generator motor 11 generates torque. The torque is transmitted to the engine output shaft via the drive shaft of the generator motor 11 and added to the output torque of the engine 2 (to assist the output of the engine 2). This output torque after the addition is absorbed by the hydraulic pump 3.

A power generating amount (an absorbed torque amount) and an electrically driving amount (an assisting amount; a generated torque amount) of the generator motor 11 change according to the generator motor command value GEN_com.

An electric swing motor 103 is coupled to a drive shaft of swing machinery 104. Driving of the swing motor 103 drives the swing machinery 104 to swing the swing body 202 through a swing pinion, a swing circle, and the like.

The swing motor 103 performs functions of a generator and a motor. The swing motor 103 is actuated as the motor and as the generator. When the swing motor 103 is actuated as the motor, the swing body 202 is actuated for swing. When swing speed of the swing body 202 is low, torque of the swing body 202 is absorbed and the swing motor 103 is actuated as the generator.

Driving of the swing motor 103 is controlled by the swing controller 102. The swing controller 102 is electrically connected to the storage device 12 through the DC power supply line and is electrically connected to the generator motor controller 100. The swing controller 102 and the generator motor controller 100 are controlled according to commands output from the controller 6.

A current supplied to the swing motor 103, i.e., swing load current SWG_curr representing a load on the swing body 202 is detected by a current sensor 101. The swing load current SWG_curr detected by the current sensor 101 is input to the controller 6. A rotation speed SWG_spd of the swing motor 103 is detected by a swing speed sensor 105 and input to the controller 6.

Figure 3:
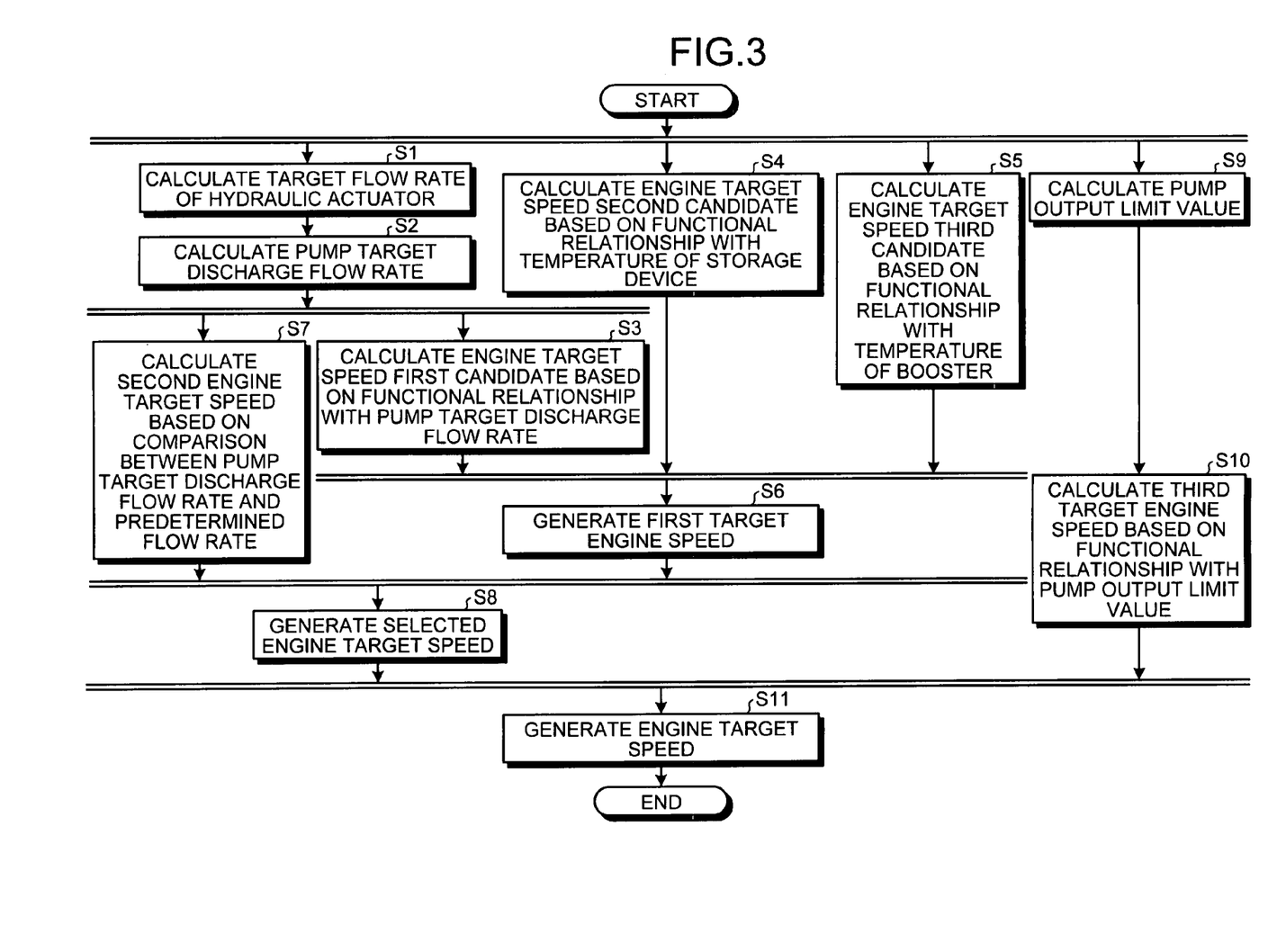
FIG. 3 is a flow chart showing a schema of processing of a method of controlling the construction machine according to the embodiment of the invention.
Figure 4:
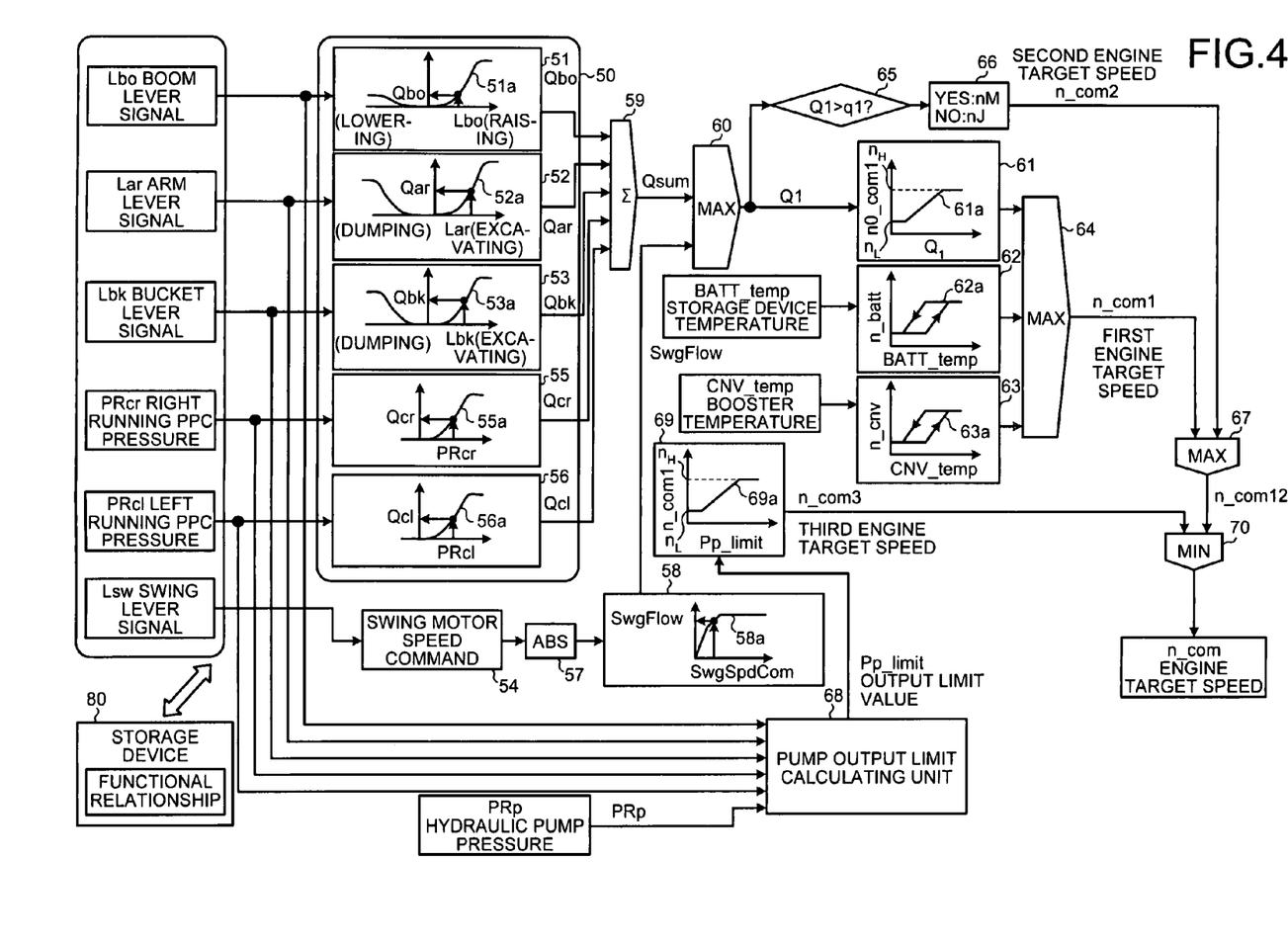
FIG. 4 is a control block diagram showing greater details of the flow chart shown in FIG. 3.

FIG. 3 is a flow chart showing a schema of a method of controlling the construction machine according to the embodiment of the invention. FIG. 4 is a control block diagram showing greater details of processing in the flow chart shown in FIG. 3. With reference to FIGS. 3 and 4, the method of controlling the construction machine according to the embodiment will be described below.

First, a hydraulic actuator target flow rate calculating unit 50 calculates a target flow rate of the hydraulic actuator (step S1). As shown in FIG. 4, the hydraulic actuator target flow rate calculating unit 50 computes a target flow rate Qbo of the boom cylinder 31, an arm target flow rate Qar of the arm cylinder 32, a bucket target flow rate Qbk of the bucket cylinder 33, a right running target flow rate Qcr of the right running motor 35, and a left running target flow rate Qcl of the left running motor 36, based on the boom lever signal Lbo, the arm lever signal Lar, the bucket lever signal Lbk, the right running pilot pressure PRcr, and the left running pilot pressure PRcl, respectevely.

A storage device 80 (storage means) stores functional relationships 51a, 52a, 53a, 55a, and 56a between the operation amounts and the target flow rates in a form of a data table for the respective hydraulic actuators. The hydraulic actuator target flow rate calculating unit 50 respectively retrieves these functional relationships 51a, 52a, 53a, 55a, and 56a from the storage device 80 and calculates the above-described various target flow rates Qbo, Qar, Qbk, Qcr, and Qcl.

A boom target flow rate calculating unit 51 computes the boom target flow rate Qbo corresponding to the current operation amount Lbo in the boom raising direction or boom lowering direction according to the functional relationship 51a.

An arm target flow rate calculating unit 52 computes the arm target flow rate Qar corresponding to the current operation amount Lar in the arm excavating direction or arm dumping direction according to the functional relationship 52a.

A bucket target flow rate calculating unit 53 computes the bucket target flow rate Qbk corresponding to the current operation amount in the bucket excavating direction or bucket dumping direction according to the functional relationship 53a.

A right running target flow rate calculating unit 55 computes the right running target flow rate Qcr corresponding to the current right running pilot pressure PRcr according to the functional relationship 55a.

A left running target flow rate calculating unit 56 computes the left running target flow rate Qcl corresponding to the current left running pilot pressure PRcl according to the functional relationship 56a.

In computation, the boom raising operation amount, the arm excavating operation amount, and the bucket excavating operation amount are treated as positive operation amounts, and the boom lowering operation amount, the arm dumping operation amount, and the bucket dumping operation amount are treated as the negative operation amounts.

Next, a pump target discharge flow rate is calculated by using the target flow rates of the respective actuators calculated by the hydraulic actuator target flow rate calculating unit 50 (step S2). In step S2, an addition unit 59 obtains the sum total (a pump target discharge flow rate Qsum) of the target flow rates Qbo, Qar, Qbk, Qcr, and Qcl of the respective hydraulic actuators computed by the hydraulic actuator target flow rate calculating unit 50 according to the following equation (1).

$$Qsum = Qbo + Qar + Qbk + Qcr + Qcl \quad (1)$$

Here, instead of the Qsum of the equation (1), the largest value of the target flow rates Qbo, Qar, Qbk, Qcr, and Qcl of the respective hydraulic actuators may be used as the pump target discharge flow rate.

The controller 6 calculates a swing motor speed command 54 by using the swing lever signal Lsw and an absolute value calculating unit 57 calculates an absolute value SwgSpdCom of the command. A swing flow rate calculating unit 58 converts the absolute value SwgSpdCom of the swing motor speed command into a swing flow rate SwgFlow.

Then, a pump target discharge flow rate calculating unit 60 selects larger one of the sum total Qsum of the target flow rates of the respective hydraulic actuators obtained by the addition unit 59 and the swing flow rate SwgFlow calculated by the swing flow rate calculating unit 58 as a pump target discharge flow rate Q1.

Then, an engine target speed first candidate calculating unit 61 retrieves a functional relationship 61a stored in the storage device 80 and calculates an engine target speed first candidate n0_com1 corresponding to the current pump target discharge flow rate Q1 based on the retrieved functional relationship 61a (step S3). The engine target speed first candidate n0_com1 is given, by the following equation (2) using a conversion constant α, as a minimum engine speed which increases as the pump target discharge flow rate Q1 increases and at which the pump target discharge flow rate Q1 can be discharged when the hydraulic pump 3 is actuated at the maximum capacity qmax.

$$n0\_com1 = (Q1/qmax) \cdot \alpha \quad (2)$$

The engine target speed first candidate n0_com1 calculated in step S3 is a candidate for the first target engine speed generated in step S6 described later.

Next, calculation of another candidate (second candidate) for the first target engine speed concurrently carried out with steps S1 to S3 will be described. An engine target speed second candidate calculating unit 62 uses the internal temperature BATT_temp of the storage device 12 to thereby calculate an engine minimum speed n_batt (first engine minimum speed) based on a functional relationship 62a stored in the storage device 80 as an engine target speed second candidate (step S4). In this sense, the engine target speed second candidate calculating unit 62 forms part of an engine minimum speed calculating means.

Figure 5:
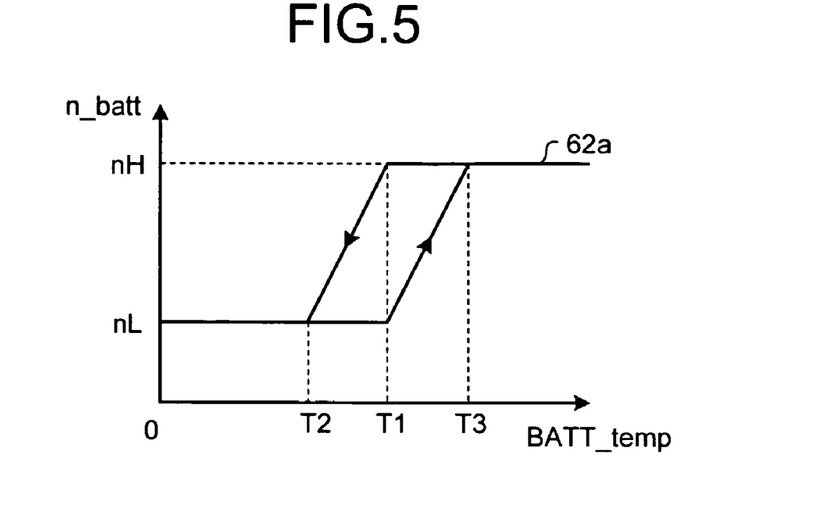

FIG. 5 is a drawing showing the functional relationship 62a which the engine target speed second candidate calculating unit 62 retrieves from the storage device 80 and refers to in step S4. The engine minimum speed n_batt is obtained and output as a value which gradually decreases as the internal temperature BATT_temp of the storage device 12 decreases from a first predetermined value T1 to a second predetermined value T2 (<T1). On the other hand, to increase the engine minimum speed n_batt which has been decreased once, the engine minimum speed n_batt is obtained and output as a value which gradually increases as the internal temperature BATT_temp of the storage device 12 increases from the first predetermined value T1 to a third predetermined value T3(>T1). A lowest value nL and a highest value nH of the functional relationship 62a are the same as a lowest value and a highest value of the functional relationship 61a.

As shown in FIG. 5, the engine minimum speed n_batt according to the temperature BATT_temp of the storage device 12 is correlated to the temperature BATT_temp to increase or be a constant value as the temperature BATT_temp increases. Therefore, a range of variation in the engine speed is narrowed and the load on the storage device 12 is reduced. As a result, the increase in the temperature of the storage device 12 can be suppressed and overheating of the storage device 12 can be prevented.

In the embodiment, yet another candidate (a third candidate) for the first target engine speed is also calculated. An engine target speed third candidate calculating unit 63 uses the internal temperature CNV_temp of the booster 16 to thereby calculate an engine minimum speed n_cnv (second engine minimum speed) based on a functional relationship 63a stored in the storage device 80 as an engine target speed third candidate (step S5). In this sense, the engine target speed third candidate calculating unit 63 forms part of an engine minimum speed calculating means. As is clear from FIG. 3, step S5 is carried out concurrently with step S4.

Figure 6:
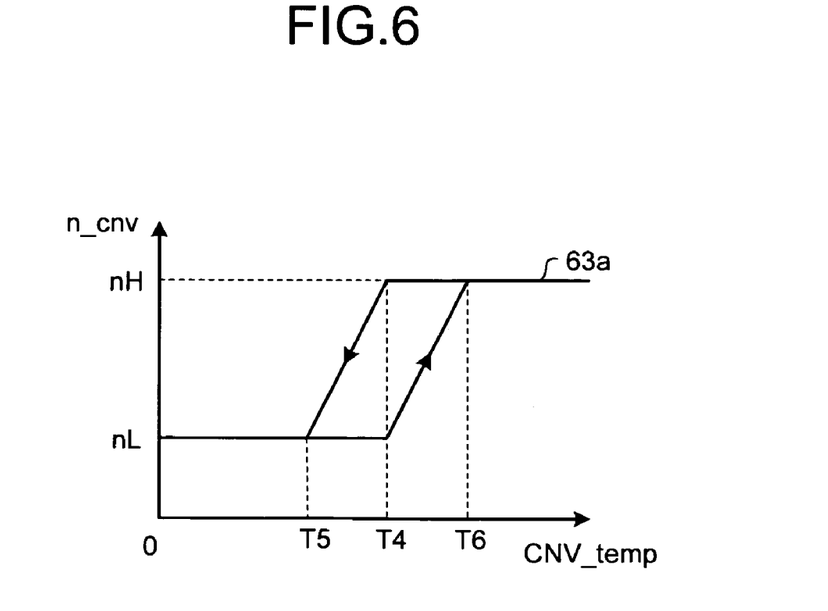

FIG. 6 is a drawing showing the functional relationship 63a which the engine target speed third candidate calculating unit 63 retrieves from the storage device 80 and refers to in step S5. The engine minimum speed n_cnv is obtained and output as a value which gradually decreases as the internal temperature CNV_temp of the booster 16 decreases from a first predetermined value T4 to a second predetermined value T5 (<T4). On the other hand, to increase the engine minimum speed n_cnv which has been decreased once, the engine minimum speed n_cnv is obtained and output as a value which gradually increases as the internal temperature CNV_temp of the booster 16 increases from the first predetermined value T4 to a third predetermined value T6 (>T4). A lowest value nL and a highest value nH of the functional relationship 63a are the same as the lowest value and the highest value of the functional relationship 61a.

As shown in FIG. 6, the engine minimum speed n_cnv according to the temperature CNV_temp of the booster 16 is correlated to the temperature CNV_temp to increase or be a constant value as the temperature CNV_temp increases. Therefore, a range of variation in the engine speed is narrowed and the load on the booster 16 is reduced. As a result, the increase in the temperature of the booster 16 can be suppressed and overheating of the booster 16 can be prevented.

In the functional relationships 62a and 63a, hysteresis is given to changes of the engine minimum speeds n_batt and n_cnv according to the temperatures. In this way, it is possible to prevent hunting in the control to thereby achieve stable control.

Although the two electric devices, i.e., the storage device 12 and the booster 16 are respectively provided with the temperature detecting means in the case described in the embodiment, the temperature detecting means may be provided to only one of them. It is also possible to set the first engine target speed by detecting temperature of another electric device such as the generator motor controller 100 and the swing controller 102 and referring to an engine minimum speed correlated to the detected temperature.

A maximum value determining unit 64 selects a highest value of the engine target speed first candidate n0_com1, the engine target speed second candidate n_batt, and the engine target speed third candidate n_cvn and the highest value is used as the first engine target speed n_com1 (the candidate for the engine target speed) (step S6).

In the embodiment, the engine target speed second candidate calculating unit 62, the engine target speed third candidate calculating unit 63, and the maximum value determining unit 64 form at least part of an engine target speed candidate generating means.

By considering the respective internal temperatures of the storage device 12 and the booster 16, which are easily affected by heat, to obtain the first engine target speed n_com1, it is possible to prevent a system from going down due to overheating of the devices.

The pump target discharge flow rate Q1 calculated in the above-described step S2 is also applied to calculation of a second engine target speed obtained based on comparison with a predetermined flow rate (step S7). In this step S7, a determining unit 65 determines whether or not the current pump target discharge flow rate Q1 is greater than the predetermined flow rate q1 (e.g., 10 (L/min)). Here, the predetermined flow rate that is a threshold value is set as a flow rate for determining whether or not the respective operating levers 41 to 44 are operated from the neutral positions.

Then, if the current pump target discharge flow rate Q1 is equal to or smaller than the flow rate q1, i.e., a determination result is NO as a result of determination by the determining unit 65, a second engine target speed setting unit 66 sets the second engine target speed n_com2 at a speed nj (e.g., 1000 rpm) around a low idle speed nL that is the lowest value of the speed of the engine 2. On the other hand, if the current pump target discharge flow rate Q1 is greater than the flow rate q1, i.e., the determination result is YES, the second engine target speed n_com2 is set at a speed nM (e.g., 1400 (rpm)) higher than the low idle speed nL of the engine 2.

A maximum value selecting unit 67 selects higher one of the first engine target speed n_com1 calculated in step S6 and the second engine target speed n_com2 calculated in step S7 and sets it as an engine target speed n_com12 (step S8).

Concurrently with above-described steps S1 to S8, a pump output limit calculating unit 68 computes an output (horsepower) limit value Pp_limit of the hydraulic pump 3 according to an operation pattern of the boom cylinder 31, the arm cylinder 32, the bucket cylinder 33, the right running motor 35, and the left running motor 36 (step S9). Here, an example of the operation patterns is "a combination of an arm excavating operation and a bucket excavating operation" and the operation patterns are set according to values of the respective pilot pressures.

Following step S9, a third engine speed calculating unit 69 computes a third engine target speed n_com3 corresponding to the output limit value Pp_limit of the hydraulic pump 3 computed by the pump output limit calculating unit 68 based on a functional relationship 69a stored in a form of a data table in the storage device 80 (step S10). In the functional relationship 69a, the third engine target speed n_com3 increases as the output limit value Pp_limit of the hydraulic pump 3 increases.

Finally, a minimum value selecting unit 70 sets lower one of the engine target speed n_com12 selected by the maximum value selecting unit 67 and the third engine target speed n_com3 as the engine target speed n_com (step S11).

Then, the controller 6 uses the engine target speed n_com selected by the minimum value selecting unit 70, the current actual speed GEN_spd of the generator motor 11 detected by the revolution sensor 14, the current voltage BATT_volt of the storage device 12 detected by the voltage sensor 15, and the swing load current SWG_curr representing the load on the swing body 202 detected by the current sensor 101 to obtain the target speed of the generator motor 11 corresponding to the engine target speed n_com, the required power generating amount of the generator motor 11, the control current pc_epc corresponding to the pump absorbed torque, and the like. Out of the obtained values, the target speed and the required power generating amount of the generator motor 11 are output to the generator motor controller 100. The generator motor controller 100 drives the generator motor 11 based on the received commands. The control current pc_epc is output to the pump control valve 5. The pump control valve 5 adjusts the inclination angle of the swash plate of the hydraulic pump 3 based on the received command.

According to the above-described one embodiment of the invention, because the engine minimum speed in carrying out the low-speed matching increases or is the constant value as the temperatures of the electric devices (storage device, booster) increase, a range of variation in the engine speed is narrowed and the loads on the electric devices are reduced. As a result, the increase in the temperatures of the electric devices can be suppressed. Therefore, it is possible to properly prevent overheating of the mounted electric devices with a simple structure without relying on increase in the capacitance of the storage device.

According to the embodiment, large cooling mechanisms for the electric devices are unnecessary, which reduces weight, saves installation space, and suppresses cost.

Although the best mode for carrying out the invention has been described so far, the invention should not be limited to the above-described one embodiment. For example, the invention can be applied to a hybrid construction machine such as a hydraulic shovel having a hydraulic swing motor as well as the hybrid construction machine having the electric swing motor.

The invention can be also applied to a hybrid vehicle other than the construction machine.

In the invention, the electric device the temperature of which is detected by the temperature detecting means may be one of the storage device and the booster. In the invention, it is also possible to obtain the engine target speed by detecting a temperature of an electric device (various controllers or an inverter) other than the storage device and the booster and using the engine minimum speed correlated to the detected temperature.

As described above, the invention can include various embodiments not described here and various changes in design can be made without departing from the scope of the technical idea defined in the claims.

Industrial Applicability

As described above, the invention is useful for controlling the system of the construction machine including the engine and the generator motor coupled to each other as the drive sources and including the hydraulic pump driven by the engine and the generator motor and is especially suitable for carrying out the low-speed matching for matching the output of the engine and the pump absorbing horsepower of the hydraulic pump to each other in the low-speed region where engine speed is lower than the predetermined set speed.

The invention claimed is:

1. A construction machine comprising:
   an engine and a generator motor coupled to each other;
   a storage device for storing electric power generated by the generator motor and supplying electric power to the generator motor;
   a hydraulic pump driven by the engine and the generator motor;
   a hydraulic actuator to which pressure oil discharged from the hydraulic pump is supplied;
   an operating unit for operating the hydraulic actuator;
   a pump target discharge flow rate calculating unit for calculating a pump target discharge flow rate of the hydraulic pump based on an operated amount of the operating unit;
   a temperature detecting unit for detecting temperature of an electric device mounted on the construction machine;
   a storage unit for storing an engine minimum speed, which is a minimum possible speed of the engine in carrying out low-speed matching for matching output of the engine and pump absorbing horsepower of the hydraulic pump to each other in a low-speed region where a speed of the engine is lower than a set speed, as a function of the temperature of the electric device where the engine minimum speed increases or is a constant value as the temperature increases;
   an engine minimum speed calculating unit for calculating the engine minimum speed corresponding to the temperature of the electric device detected by the temperature detecting unit based on the temperature of the electric device and the function stored in the storage unit; and
   an engine target speed candidate generating unit for generating a maximum value out of a corresponding speed of the pump target discharge flow rate calculated by the pump target discharge flow rate calculating unit and the engine minimum speed calculated by the engine minimum speed calculating unit as a candidate for an engine target speed.

2. The construction machine according to claim 1, wherein the electric device is the storage device.

3. The construction machine according to claim 1, further comprising a booster for boosting voltage of the storage device to output, wherein the electric device is the booster.

4. The construction machine according to claim 1, further comprising a booster for boosting voltage of the storage device to output, wherein the electric devices are the storage device and the booster, and
   the engine minimum speed calculating unit calculates a first engine minimum speed and a second engine minimum speed respectively corresponding to a temperature of the storage device and a temperature of the booster detected by the temperature detecting unit.

5. A method of controlling a construction machine, which includes an engine and a generator motor coupled to each other, a storage device for storing electric power generated by the generator motor and supplying electric power to the generator motor, a hydraulic pump driven by the engine and the generator motor, a hydraulic actuator to which pressure oil discharged from the hydraulic pump is supplied, and an operating unit for operating the hydraulic actuator, the method comprising:
   a pump target discharge flow rate calculating step for calculating a pump target discharge flow rate of the hydraulic pump based on an operated amount of the operating unit;
   a temperature detecting step for detecting temperature of an electric device mounted on the construction machine;
   an engine minimum speed calculating step for calculating an engine minimum speed, which is a minimum possible speed of the engine in carrying out low-speed matching for matching output of the engine and pump absorbing horsepower of the hydraulic pump to each other in a low-speed region where a speed of the engine is lower than a set speed, by using the temperature of the electric device detected in the temperature detecting step; and
   an engine target speed candidate generating step for generating a maximum value out of a corresponding speed of the pump target discharge flow rate calculated in the pump target discharge flow rate calculating step and the engine minimum speed calculated in the engine minimum speed calculating step as a candidate for an engine target speed, wherein
   the engine minimum speed is a function of the temperature of the electric device where the engine minimum speed increases or is a constant value as the temperature increases.

* * * * *